United States Patent
Beeler

(10) Patent No.: US 8,830,903 B2
(45) Date of Patent: Sep. 9, 2014

(54) IDENTIFICATION, ALIGNMENT AND CROSS POLARIZATION OPTIMIZATION FOR ORTHOGONAL POLARIZED TRANSMISSION AND RELAY SYSTEMS

(75) Inventor: Michael Beeler, Jefferson, MD (US)

(73) Assignee: Comtech EF Data Corp., Tempe, AZ (US)

( * ) Notice: Subject to any disclaimer, the term of this patent is extended or adjusted under 35 U.S.C. 154(b) by 851 days.

(21) Appl. No.: 13/046,539

(22) Filed: Mar. 11, 2011

(65) Prior Publication Data

US 2011/0206095 A1    Aug. 25, 2011

Related U.S. Application Data

(60) Provisional application No. 61/349,762, filed on May 28, 2010.

(51) Int. Cl.

| | |
|---|---|
| H04B 1/707 | (2011.01) |
| H04B 7/185 | (2006.01) |
| H04B 7/155 | (2006.01) |
| H04B 10/532 | (2013.01) |
| H04B 14/00 | (2006.01) |
| H04B 10/61 | (2013.01) |
| H04J 14/06 | (2006.01) |

(52) U.S. Cl.
CPC .......... *H04B 7/18515* (2013.01); *H04B 7/1555* (2013.01); *H04B 10/532* (2013.01); *H04B 14/008* (2013.01); *H04B 10/614* (2013.01); *H04J 14/06* (2013.01)
USPC ........................................................ 370/316

(58) Field of Classification Search
CPC ............. H04B 10/6166; H04B 10/614; H04B 14/008; H04B 7/1555; H04B 10/532; H04J 14/06
See application file for complete search history.

(56) References Cited

U.S. PATENT DOCUMENTS

| | | | | |
|---|---|---|---|---|
| 7,076,168 | B1 * | 7/2006 | Shattil | 398/76 |
| 7,298,789 | B2 * | 11/2007 | Kubo et al. | 375/279 |
| 7,747,170 | B2 * | 6/2010 | Tamai | 398/77 |
| 2001/0003442 | A1 * | 6/2001 | Smith | 342/365 |
| 2002/0080450 | A1 * | 6/2002 | Hait | 359/158 |
| 2004/0184556 | A1 * | 9/2004 | Kubo et al. | 375/295 |
| 2007/0122153 | A1 * | 5/2007 | Tamai | 398/77 |
| 2007/0211786 | A1 * | 9/2007 | Shattil | 375/141 |
| 2009/0061788 | A1 * | 3/2009 | Su | 455/73 |
| 2009/0110033 | A1 * | 4/2009 | Shattil | 375/141 |
| 2012/0207476 | A1 * | 8/2012 | Agrell et al. | 398/65 |

* cited by examiner

*Primary Examiner* — Jay P Patel
(74) *Attorney, Agent, or Firm* — Booth Udall Fuller, PLC

(57) ABSTRACT

A method of and system for distinguishing polarizations and information about the carrier signals transmitted from a repeating relay comprising encoding, using an encoder, a first data stream and a second data stream at a repeating relay, modulating, using a modulator, the first and second encoded data streams at the repeating relay, spreading, using a spreader, the first modulated data stream such that a first spread waveform results having first spreading characteristics and the second modulated data stream such that a second spread waveform results having second spreading characteristics, wherein the first spreading characteristics and the second spreading characteristics are different and differentiate the first spread waveform from the second spread waveform, and transmitting the first spread waveform as a first spread spectrum carrier signal on a first electromagnetic polarization and the second spread waveform as a second spread spectrum carrier signal on a second EM polarization.

77 Claims, 10 Drawing Sheets

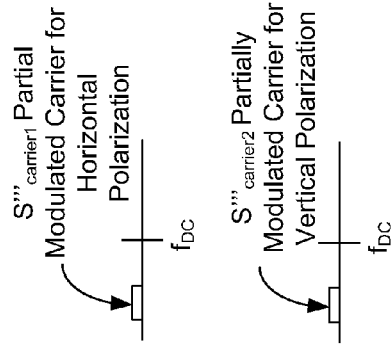
FIG. 10A — Improperly Pointed to Source
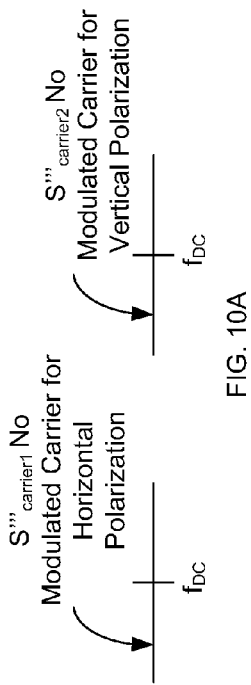
FIG. 10B — Partially Cross Polarized – Cross Polarization Interference
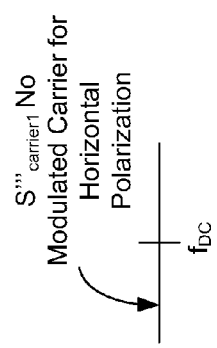
FIG. 10C — Pointed to Source Vertical Polarization Optimized
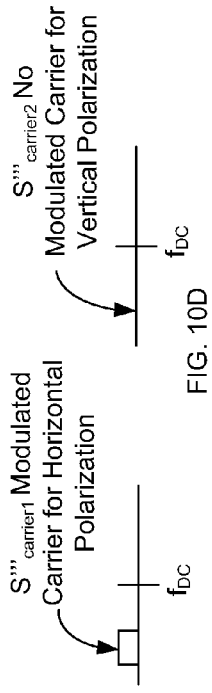
FIG. 10D — Pointed to Source Horizontal Polarization Optimized

IDENTIFICATION, ALIGNMENT AND CROSS POLARIZATION OPTIMIZATION FOR ORTHOGONAL POLARIZED TRANSMISSION AND RELAY SYSTEMS

CROSS REFERENCE TO RELATED APPLICATIONS

This document claims the benefit of the filing date of U.S. Provisional Patent Application No. 61/349,762, entitled "Identification, Alignment and Cross Polarization Optimization for Orthogonal Polarized Transmission and Relay Systems" to Michael Beeler, which was filed on May 28, 2010, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Since the introduction of electromagnetic (EM) transmission, a recurring problem continuing to challenge the industry is an improperly pointed antenna. The problem is most prevalent in the satellite industry, but the technology described in this disclosure is not limited to satellite transmission systems. An improperly pointed antenna results in interference with stations as a result of an EM carrier transmitting in the wrong direction or polarization thereby radiating an incorrect destination or EM polarization.

An inaccurately pointed antenna may be due to improper setting of the azimuth and elevation angle being configured. A second type of improperly configured antenna is the result of the polarization angle being set improperly, resulting in the EM orthogonal polarization being radiated. Additionally, a third type of improperly pointed antenna is an antenna system mounted on a vehicle in motion where constant alignment must be maintained to communicate with a stationary destination. Still a fourth type of improperly pointed antenna is an antenna that has been perturbed due to wind, human or mechanical change resulting in movement such that the antenna is no longer properly pointed to the destination.

Most improperly pointed antennas are primarily due to human error. In many situations, the improperly pointed antenna results in service disruption due to interference with a carrier assigned to operate at the same frequency or polarization.

U.S. Pat. Nos. 6,694,137 and 7,526,249, which are herein incorporated by reference in their entirety include examples of conventional systems and methods of satellite communications utilizing antennas.

SUMMARY

Implementations of a method of distinguishing polarizations and information about the carrier signals transmitted from a repeating relay may comprise encoding, using an encoder, a first data stream and a second data stream at a repeating relay, modulating, using a modulator, the first and second encoded data streams at the repeating relay, spreading, using a spreader, the first modulated data stream such that a first spread waveform results having first spreading characteristics and the second modulated data stream such that a second spread waveform results having second spreading characteristics, wherein the first spreading characteristics and the second spreading characteristics are different and differentiate the first spread waveform from the second spread waveform, and transmitting from the repeating relay, the first spread waveform as a first spread spectrum carrier signal on a first electromagnetic (EM) polarization and the second spread waveform as a second spread spectrum carrier signal on a second EM polarization different from the first EM polarization.

Particular implementations may comprise one or more of the following features. The first and second carrier signals may exhibit similar encoding and modulation characteristics. The data stream may contain information about at least one of an owner, a location, a power, a frequency capability, and an adjacent repeater of the repeating relay. At least one of the first and second carrier signals may comprise data containing information about the repeating relay. The modulation format, Forward Error Coding (FEC) rate, center frequency, and symbol rate may be the same for the first and second carrier signals.

The method may further comprise receiving, at a receiver, the first spread spectrum carrier signal and the second spread spectrum carrier signal and distinguishing between the first EM polarization and the second EM polarization based on different spreading characteristics exhibited on the respective first and second spread spectrum carrier signals. The method may further comprise identifying a spread spectrum sequence for the first and second carrier signals based on a unique spread sequence that is applied to each carrier signal. Spreading the first and second modulated data streams may further comprise applying the same spread sequence to each of the first and second modulated data streams and further phase advancing the first spread waveform from the second spread waveform on an orthogonal polarization.

Spreading the first and second modulated data streams may further comprise applying the same spread sequence to each of the first and second modulated data streams and further phase retarding the first spread waveform from the second spread waveform on an orthogonal polarization. The first and second carrier signals may have different center frequencies. The first and second carrier signals may have different symbol rates. The first and second encoded data streams may be modulated using different modulation formats. The first and second carrier signals may have different FEC types. The first and second carrier signals may have different FEC rates.

At least one of the first and second carrier signals may be allocated a spectrum having no other carrier present within the spectrum. At least one of the first and second carrier signals may exist with an additional carrier present within at least a portion of a bandwidth to which the at least one of the first and second carrier signals is allocated. The additional carrier may be present within the entire bandwidth to which at least one of the first and second carrier signals is allocated. The transmitting may further comprise transmitting the first and second carrier signals to the repeating relay. The method may further comprise transmitting from the repeating relay within at least one of the first carrier signal and the second carrier signal, information from a remote transmission device. The method may further comprise storing using a storing device, information about the repeating relay received from the repeating relay.

Implementations of a method of distinguishing polarizations of carrier signals transmitted from a repeating relay may comprise receiving, at a receiver, a first spread spectrum carrier signal transmitted from a repeating relay on a first electromagnetic (EM) polarization and a second spread spectrum carrier signal transmitted from the repeating relay on a second EM polarization, different from the first EM polarization and distinguishing between the first EM polarization and the second EM polarization based on different spreading characteristics exhibited on the respective first and second spread spectrum carrier signals.

Particular implementations may comprise one or more of the following features. The first and second carrier signals may exhibit similar encoding and modulation characteristics. The data stream may contain information about at least one of an owner, a location, a power, a frequency capability, and an adjacent repeater of the repeating relay. At least one of the first and second carrier signals may comprise data containing information about the repeating relay. The method may further comprise despreading, using a despreader, a spread waveform, demodulating, using a demodulator, the despread waveform, and decoding, using a decoder, the demodulated waveform such that a data stream results. The modulation format, Forward Error Coding (FEC) rate, center frequency, and symbol rate may be the same for each of the first and second carrier signals.

The unique spread sequences may be a piori and are pre-programmed into a detection device for providing detection status of a detected signal. The unique spread sequences may be loaded into a detection device on demand. The method may further comprise identifying a spread spectrum sequence for the first and second carrier signals corresponding to a unique spread sequence that is applied to each carrier signal. The method may further comprise identifying a spread spectrum sequence for the first and second carrier signals wherein the spread spectrum sequence is the same and the first spread waveform is phase advanced from the second spread waveform on an orthogonal polarization. The method may further comprise identifying a spread spectrum sequence for the first and second carrier signals wherein the spread spectrum sequence is the same and the first spread waveform is phase retarded from the second spread waveform on an orthogonal polarization.

The first and second carrier signals may have different center frequencies. The first and second carrier signals may have different symbol rates. The first and second carrier signals may be demodulated using different demodulation formats. The first and second carrier signals may have different FEC types. The first and second carrier signals may have different FEC rates. At least one of the first and second carrier signals may be allocated a spectrum having no other carrier present within the spectrum. At least one of the first and second carrier signals may exist with an additional carrier present within at least a portion of a bandwidth to which the at least one of the first and second carrier signals is allocated. The additional carrier may be present within the entire bandwidth to which the at least one of the first and second carrier signals is allocated. The method may further comprise indicating, by the receiver, identification of a desired repeating relay. The method may further comprise indicating, by the receiver, identification of an undesired repeating relay.

Implementations of a system for distinguishing polarizations and information about the carrier signals transmitted from a repeating relay may comprise an encoder that encodes a first data stream and a second data stream at a repeating relay, a modulator that modulates the first and second encoded data streams at the repeating relay, a spreader that spreads the first modulated data stream such that a first spread waveform results having first spreading characteristics and the second modulated data stream such that a second spread waveform results having second spreading characteristics, wherein the first spreading characteristics and the second spreading characteristics are different and differentiate the first spread waveform from the second spread waveform, and a transmitting device that transmits from the repeating relay, the first spread waveform as a first spread spectrum carrier signal on a first electromagnetic (EM) polarization and the second spread waveform as a second spread spectrum carrier signal on a second EM polarization different from the first EM polarization.

Particular implementations may comprise one or more of the following features. The first and second carrier signals may exhibit similar encoding and modulation characteristics. The data stream may contain information about at least one of an owner, a location, a power, a frequency capability, and an adjacent repeater of the repeating relay. At least one of the first and second carrier signals may comprise data containing information about the repeating relay. The modulation format, Forward Error Coding (FEC) rate, center frequency, and symbol rate is the same for the first and second carrier signals.

The system may further comprise a receiver that receives the first spread spectrum carrier signal and the second spread spectrum carrier signal and distinguishes between the first EM polarization and the second EM polarization based on different spreading characteristics exhibited on the respective first and second spread spectrum carrier signals. The receiver may identify a spread spectrum sequence for the first and second carrier signals based on a unique spread sequence that is applied to each carrier signal. The spreader may apply the same spread sequence to each of the first and second modulated data streams and phase advances the first spread waveform from the second spread waveform on an orthogonal polarization. The spreader may apply the same spread sequence to each of the first and second modulated data streams and phase retards the first spread waveform from the second spread waveform on an orthogonal polarization. The first and second carrier signals may have different center frequencies. The first and second carrier signals may have different symbol rates. The modulator may modulate the first and second encoded data streams using different modulation formats.

The first and second carrier signals may have different FEC types. The first and second carrier signals may have different FEC rates. At least one of the first and second carrier signals may be allocated a spectrum having no other carrier present within the spectrum. At least one of the first and second carrier signals exists with an additional carrier present within at least a portion of a bandwidth to which the at least one of the first and second carrier signals is allocated. The additional carrier may be present within the entire bandwidth to which at least one of the first and second carrier signals is allocated. The transmitting device may further transmit the first and second carrier signals to the repeating relay. The transmitting device may further transmit from the repeating relay within at least one of the first carrier signal and the second carrier signal, information from a remote transmission device. The system may further comprise a storing device that stores information about the repeating relay received from the repeating relay.

Implementations of a system for distinguishing polarizations of carrier signals transmitted from a repeating relay may comprise a receiver that receives a first spread spectrum carrier signal transmitted from a repeating relay on a first electromagnetic (EM) polarization and a second spread spectrum carrier signal transmitted from the repeating relay on a second EM polarization, different from the first EM polarization wherein the receiver distinguishes between the first EM polarization and the second EM polarization based on different spreading characteristics exhibited on the respective first and second spread spectrum carrier signals.

Particular implementations may comprise one or more of the following features. The first and second carrier signals may exhibit similar encoding and modulation characteristics. The data stream may contain information about at least one of an owner, a location, a power, a frequency capability, and an adjacent repeater of the repeating relay. At least one of the first and second carrier signals may comprise data containing information about the repeating relay. The system may further comprise a despreader that dispreads a spread waveform, a demodulator that demodulates the despread waveform, and a decoder that decodes the demodulated waveform such that a data stream results. The modulation format, Forward Error Coding (FEC) rate, center frequency, and symbol rate may be the same for each of the first and second carrier signals.

The system may further comprise a detection device configured to provide detection status of a detected signal wherein the unique spread sequences are a piori and are pre-programmed into the detection device. The system may further comprise a detection device configured to receive the unique spread sequences on demand. The receiver may further identify a spread spectrum sequence for the first and second carrier signals corresponding to a unique spread sequence that is applied to each carrier signal. The receiver may further identify a spread spectrum sequence for the first and second carrier signals wherein the spread spectrum sequence is the same and the first spread waveform is phase advanced from the second spread waveform on an orthogonal polarization.

The receiver may further identify a spread spectrum sequence for the first and second carrier signals wherein the spread spectrum sequence is the same and the first spread waveform is phase retarded from the second spread waveform on an orthogonal polarization. The first and second carrier signals may have different center frequencies. The first and second carrier signals may have different symbol rates. The first and second carrier signals may be demodulated using different demodulation formats. The first and second carrier signals may have different FEC types. The first and second carrier signals may have different FEC rates. At least one of the first and second carrier signals may be allocated a spectrum having no other carrier present within the spectrum. At least one of the first and second carrier signals may exist with an additional carrier present within at least a portion of a bandwidth to which the at least one of the first and second carrier signals is allocated. The additional carrier may be present within the entire bandwidth to which the at least one of the first and second carrier signals is allocated. The receiver may indicate identification of a desired repeating relay. The receiver may indicate identification of an undesired repeating relay.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIGS. 10A-D depict scenarios for optimizing pointing and polarization.

DESCRIPTION

Figure 1:
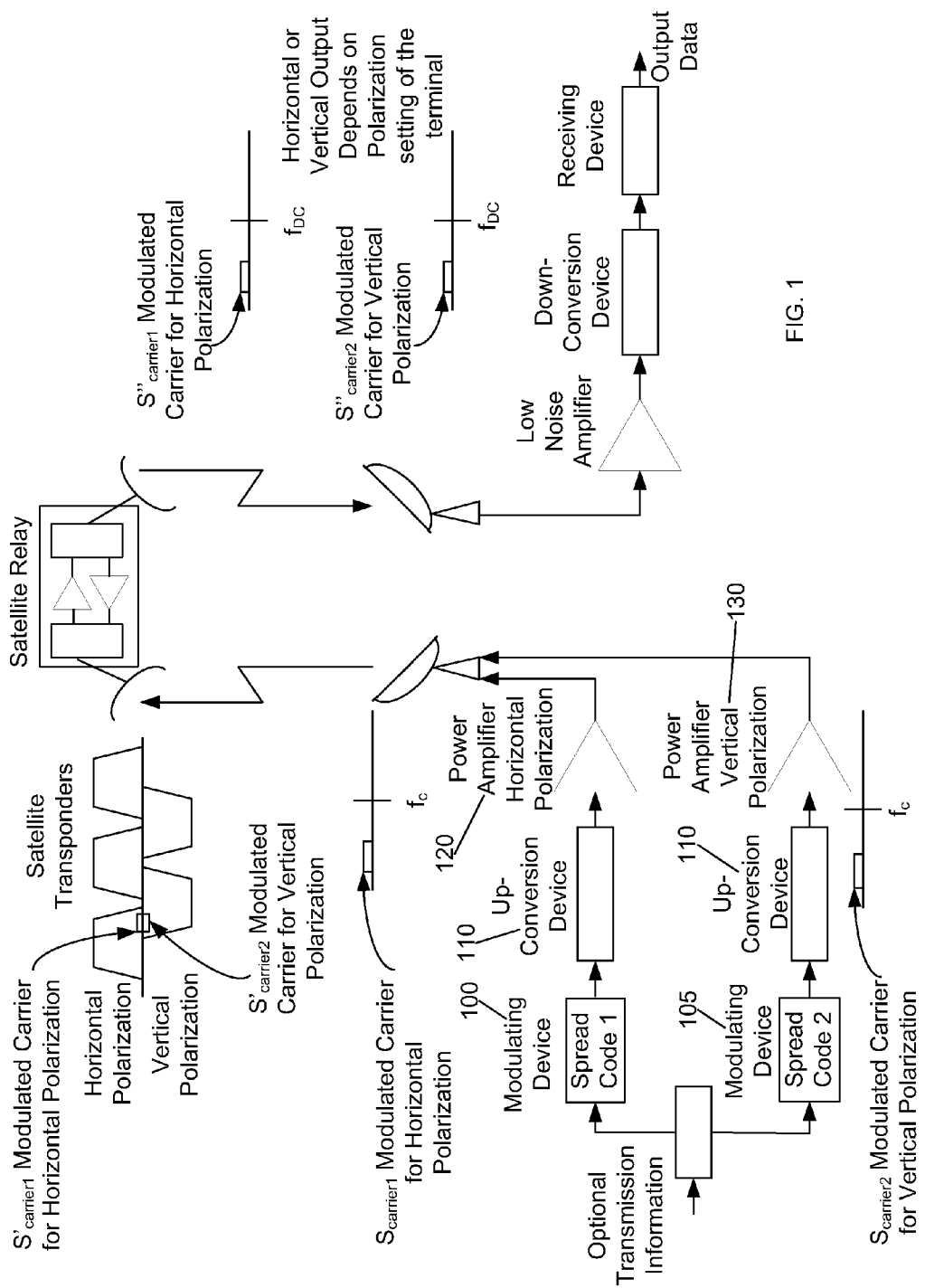
FIG. 1 provides a representation of an implementation of a transmission system with electromagnetically orthogonal transmission.

This disclosure, its aspects and implementations, are not limited to the specific components, frequency examples, or methods disclosed herein. Many additional components and assembly procedures known in the art consistent with optimization techniques for antenna pointing and cross polarization are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to a system and method of identifying and optimizing the pointing and cross polarization for an antenna for point-to-point, point-to-multipoint and/or multipoint-to-multipoint for stationary, nomadic and mobile (air, land and sea) terminals.

More specifically, this disclosure relates to methods for identification and optimization for pointing polarization to or from a transmission source. In some implementations, information carried in the modulated carriers may include information that may include but is not limited to timing, identity, location (geographic or orbital), or any other relevant information regarding the source or target destination to where the antenna should be pointed. The information may be utilized to confirm the identity about the transmission or relay source, etc. Particular implementations described herein are and may use, but are not limited to, field-programmable gate arrays (FPGA), digital signal processors, or microprocessors.

The methods described herein provide the ability for someone skilled in the art, e.g., a satellite installer or repair technician, to rapidly utilize a device using the methods described to manually improve pointing and alignment precision with direct human involvement. These methods can be completely automated to be implemented in a fashion that does not involve human interaction after initial setup and configuration which can be easily implemented in FPGA, digital signal processors, Application Specific Integrated Circuit (ASIC), Programmable Integrated Circuit (PIC), or any other microprocessors using conventional implementation methods known in the art with knowledge of this disclosure.

By modulating the transmission carrier with spread spectrum technology and chipping a modulating sequence, coding gain that may be utilized to aid in detection of the carrier. The methods disclosed herein provide optimization for pointing in both azimuth and elevation (pointing to the source) as well as optimizing cross polarization. The transmission carrier may be modulated as a method for transmitting information about the source or relay. As most antennas are constructed in a fashion that produces a Fresnel-type radiation pattern, the antenna may be thought of to have a lobe-type structure when radiating. Therefore, when pointing to a transmission source, the objective is to point the antenna such at it is aligned so the peak of the main lobe of the antenna is in the boresight. A typical antenna may have a 3 Decibel (3 dB) beam width of 2°. Therefore, achieving pointing can be difficult due to the narrow beam width of the antenna. Using a spread spectrum carrier with tremendous coding gain, on the order of hundreds, thousands or millions of times allows for a severally mispointed antenna to still find a satellite that is considerably more than 2° away from the desired boresight. However the beam width is significantly larger than 2° as the angle deviates away from the boresight of the antenna. Additionally, once the transmission has been identified and the proper azimuth and elevation are established, the method described allows the polarization to be optimized using this method.

Particular implementations of the methods described herein operate from the originating source of the EM transmission or relay device. An electromagnetically orthogonal transmission may then be transmitted directly to a receiving station or relayed over a repeating relay device such as a satellite relay. The receiving station and associated devices may employ digital signal processing (DSP) techniques such as adaptive filtering or equalization, which can be easily implemented in FPGA, digital signal processors, Application Specific Integrated Circuit (ASIC), Programmable Integrated Circuit (PIC) or microprocessors using conventional implementation methods known in the art with knowledge of this disclosure.

Aspects of this disclosure relate to a method and system for creating orthogonally situated EM carriers from a transmission source for transmission, and reception, demodulation, decoding and processing of the received information to aid in the identification and optimization installation and/or tracking of the transmission source.

The methods disclosed herein for identifying, pointing and setting the cross polarization are accomplished through the use of orthogonally polarized carriers from a transmission source or relay station. The EM carriers may be at, but are not limited to, the same frequency, symbol rate, modulation or forward error correction (FEC) on the respective EM orthogonal polarizations. In some implementations, transmission methods may use spread spectrum technology where a carrier is transmitted on each EM orthogonal polarization and may use the same frequency, symbol rate, modulation and FEC, but utilize spread spectrum coding where the pseudo-random noise (PRN) sequence are to be considered "code" orthogonal or nearly orthogonal and possess good cross-correlation properties. The process of using spread spectrum with code orthogonality, with strong cross correlation properties, allows to carriers to be separated and uniquely identified.

The methods disclosed herein may allow transmitted carrier signals to contain information about the source or relay to be carried on the modulated carriers on respective EM polarizations. Additionally, the carrier signals may be modulated with information. If the modulated carrier signals contain information about the transmission source such as, for example, timing, identity, location (geographic or orbital), etc. of the source or target destination to where the antenna should be pointed, the information may be utilized to confirm the identity of the transmission source. A plurality of the EM orthogonal carrier signals, on respective EM polarizations may be utilized to optimize the azimuth and elevation of an antenna by peaking the alignment of the antenna using the signal-to-noise ratio (SNR) of either of the orthogonal carriers. As the antenna becomes properly pointed into the boresight, the SNR peaks. The EM orthogonal carrier signals may be utilized to either peak or null the desired EM polarization to achieve optimal pointing of the antenna. Optimization of the EM polarization is accomplished by peaking the carrier on the desired EM polarization and nulling out the carrier on the undesired EM polarization to achieve optimal performance for operation with the transmission or relay device. Additionally, the act of spreading the transmitted carrier to both electromagnetically orthogonal polarizations results in a waveform that may be received to optimize the receiving portion of the antenna as well as the transmitting portion of the antenna.

Particular implementations of source identification, alignment and polarization optimization, herein may be specifically employed in satellite communications systems. However, as will be clear to those of ordinary skill in the art from this disclosure, the principles and aspects disclosed herein may readily be applied to any EM such as, for example, IF, RF and optical) communications system without undue experimentation.

FIG. 1 illustrates a particular implementation of a communications transmission system wherein the output has been modulated to Radio Frequency (RF). The input comprises optional information that may be input as real-time, near real-time or pre-positioned for on demand or repetitive output. However, in an implementation, information about the transmission source may include timing, identity, location (geographic or orbital), or any other appropriate information regarding the transmission source or target destination to which the antenna should be pointed. The method does not require the input of any input information to the modulated carrier. The modulating devices 100, 105 on each respective transmission chain, comprise a modulated carrier represented as $s_{carrier1}(t)=B_1 chipped_I cos(\omega_c t+\phi_{c1})+B_1 chipped_Q sin(\omega_c t+\phi_{c1})$ and represented as $S_{carrier1}$ for one electromagnetically orthogonal polarization, and $s_{carrier2}(t)=B_2 chipped_I cos(\omega_c t+\phi_{c2})+B_2 chipped_Q sin(\omega_c t+\phi_{c2})$ and represented as $S_{carrier2}$ for the other electromagnetically orthogonal polarization. The modulated spread spectrum output may or may not contain information about the transmission source such as, for example, timing, identity, location (geographic or orbital), or any other relevant information regarding the source or target destination to which the antenna should be pointed. Such information may be utilized to confirm the identity of the transmission source or target destination.

Figure 2:
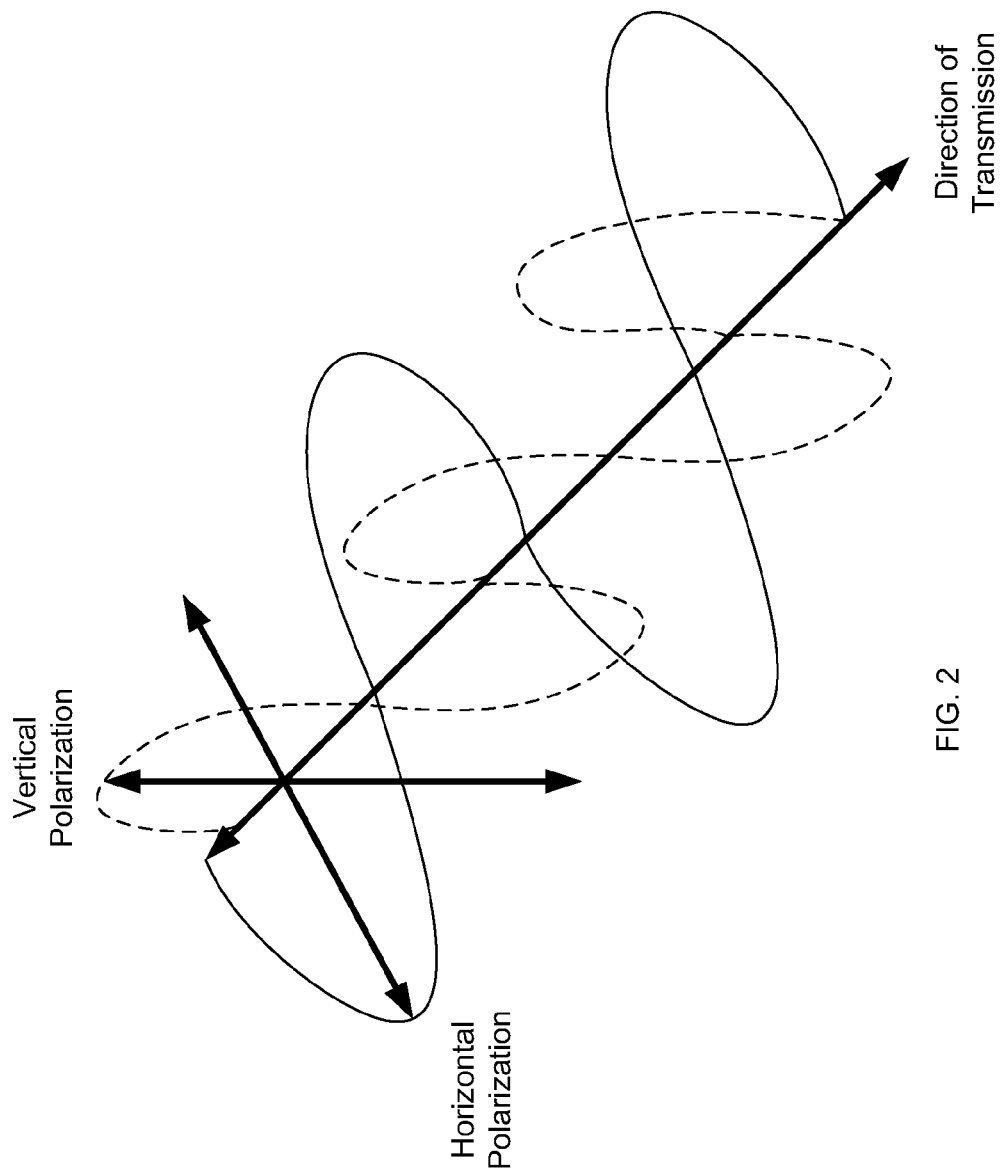
FIG. 2 depicts E-Fields of an electromagnetically orthogonal waveform.

In the particular implementation illustrated in FIG. 1, the output of the modulating devices contains modulated data operating at an intermediate frequency. Some implementations may use Binary Phase Shift Keying (BPSK) as the modulation of the spread spectrum carriers, however, one of ordinary skill in the art would recognize that any appropriate modulation format may be used. The output of the modulating devices 100, 105 are then passed to upconversion devices 110 where the frequency may be converted to a higher frequency or output directly to a high power amplifier 120. The $S_{carrier1}$ and $S_{carrier2}$ carrier signals, once high power amplified, may be multiplexed with other signals for transmission. The output of the multiplexed signals are then combined in an Orthogonal Mode Transducer (OMT) and delivered to a transmission antenna. As one skilled in the art would refer, carriers $S_{carrier1}$ and $S_{carrier2}$ are EM orthogonally combined to create a composite RF carrier signal that is radiated by the antenna. Therefore, the radiated output comprises a plurality of carriers that are electromagnetically orthogonal as shown in FIG. 2, where the electric field (E-plane) of $S_{carrier1}$ is orthogonal to the electric field of $S_{carrier2}$. The carriers' respective electromagnetically orthogonal E-fields are separated by 90° between each E-field. In the EM orthogonal transmission system, the separation between the polarizations typically provides 30 dB of isolation between the respective EM polarizations.

Figure 3:
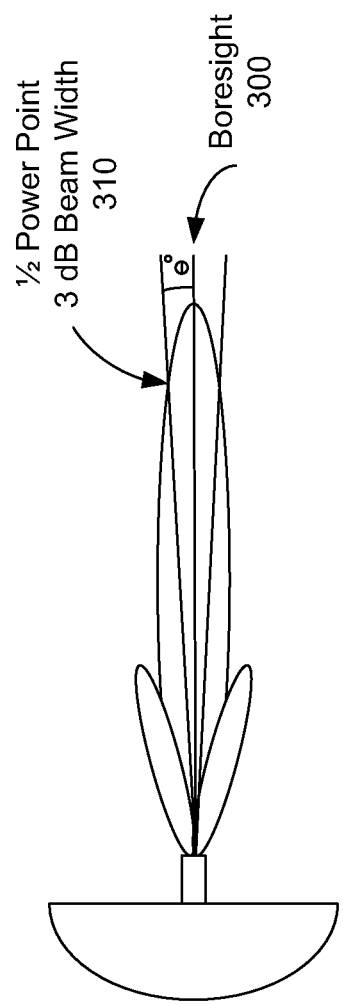
FIG. 3 is a diagram of an implementation of a directional antenna.
Figure 4:
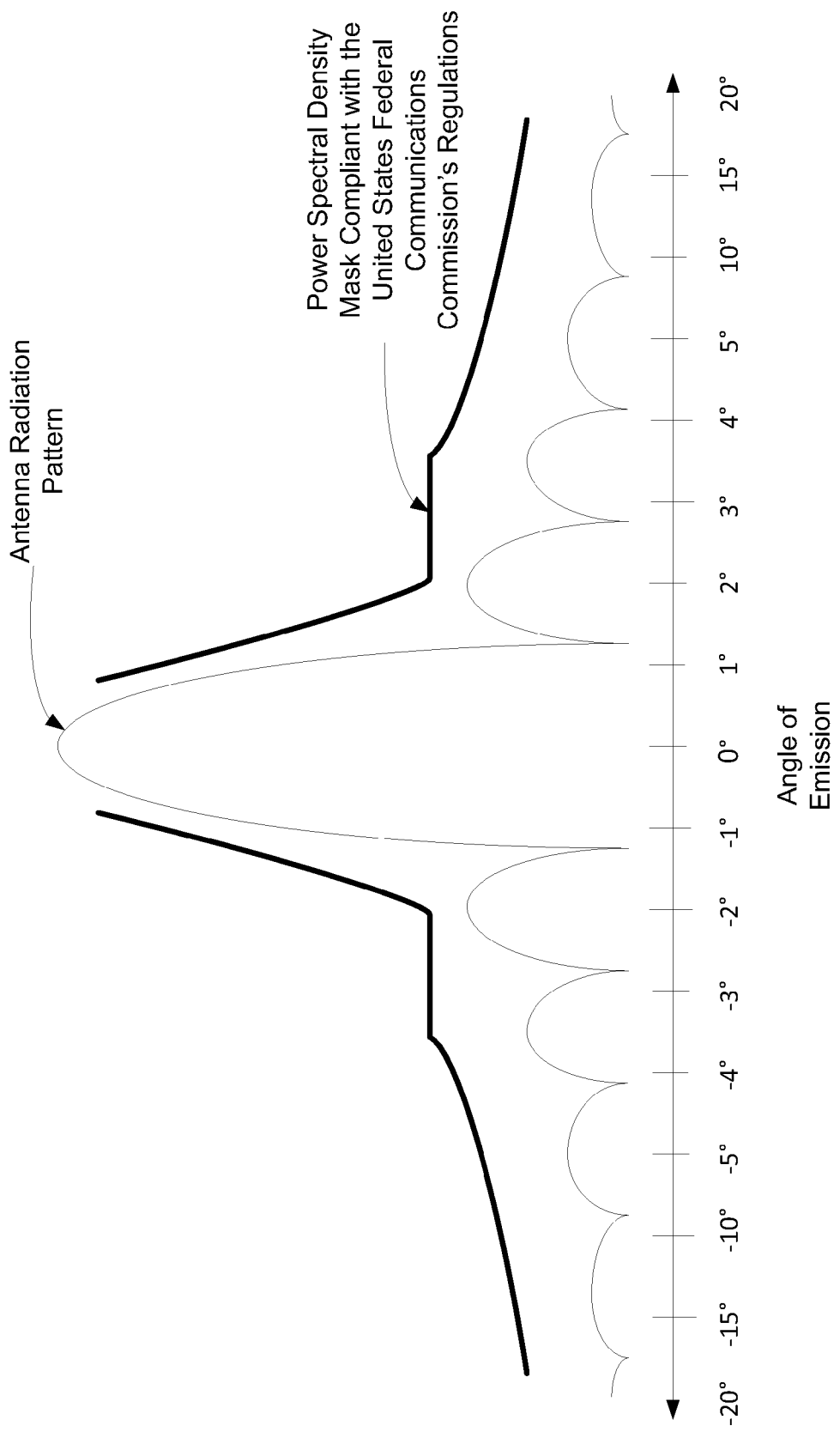
FIG. 4 shows a directional antenna pattern as power spectral density (PSD) versus pointing angle of an antenna that is compliant with the United States Federal Communications Commission's (FCC) regulation.

FIGS. 3 and 4 show a transmitting antenna radiation pattern. The radiation pattern demonstrates the main and side lobes as energy being transmitted from the antenna. The antenna may transmit the energy shown in FIG. 2 as a combined beam with both EM polarizations present.

Directional EM antennas radiate in a directional pattern as shown in FIG. 3. The center of the main lobe's beam is referred to in the art as the "boresight" 300. The 3 dB beam width of an antenna is defined as the half power point of the beam 310. The sharper the antenna, the narrower the beam is in the direction of the transmission. For antennas that are bi-directional, e.g., share a common transmit and receive path, using the described method allows the transmit and receive modes of the antenna to be aligned by setting the receive path. Therefore, when aligning the receive path, the transmit is set properly by default. The method described uses a spread spectrum carrier for both polarizations such that if the PRN codes are truly orthogonal and the coding gain is high enough, detection may be achieved by the receiver even if the antenna is severely off point. A typical antenna has a 3 dB beam width of approximately 2°, however one of ordinary skill in the art would recognize that the methods and related systems of this disclosure may be applicable to antennas having any 3 dB beam width.

Given the antenna shown in FIG. 3, the beam is inherently narrow and accordingly, the ability to point a narrow-beam antenna having a beam width of 2° or less may be difficult. The addition of a spread low-bit rate carrier allows the original carrier signal to be identified if the chip-to-symbol (spread factor) is significantly high such that the coding gain can be brought to bear to compensate for the narrow beam width.

FIG. 4 shows that the antenna beam width of an antenna can be large. Therefore, even with an offset from the boresight beyond +/−10° (for very- or ultra-small antennas), the carrier can still be found. Due to the improved detection using the described method, the width of the beam becomes less critical, and the source may be located in a more coarse fashion. The coding gain that may be brought to bear on a low-data rate carrier signal may be significant. As an example, a 10-bit per second carrier can be spread by a factor of 100,000 times for a coding gain of 10,000. A coding gain of 10,000 translates to an increase in decoding capability in decibels of 10 Log (Coding Gain). Therefore, a coding gain of 10,000 provides 40 dB of gain. As such, 100 KHz of dedicated spectrum on each EM polarization may be used to provide a 10-bit per second carrier for the described method. The coding gain enables greater detection of the transmission source since the carrier can be more easily detected at significantly reduced power levels. The resulting carrier could be detected at a level as low as −40 dB below the optimal pointing angle, resulting in a tremendous pointing error and still being able to find the carrier on a satellite several orbital locations away. As the antenna is more accurately pointed toward the source, the detected energy from the detector will proportionally increase to an optimal value. As shown in FIG. 4, a window of +/−10° is easily achievable using the described method.

For Communication on the Move (COTM) terminals, the antennas are inherently smaller and have very wide radiation beams, so this method can be brought to bear to enhance the detection and identification of a transmission source even when the antenna is coarsely pointed in the direction of the source.

Figure 5:
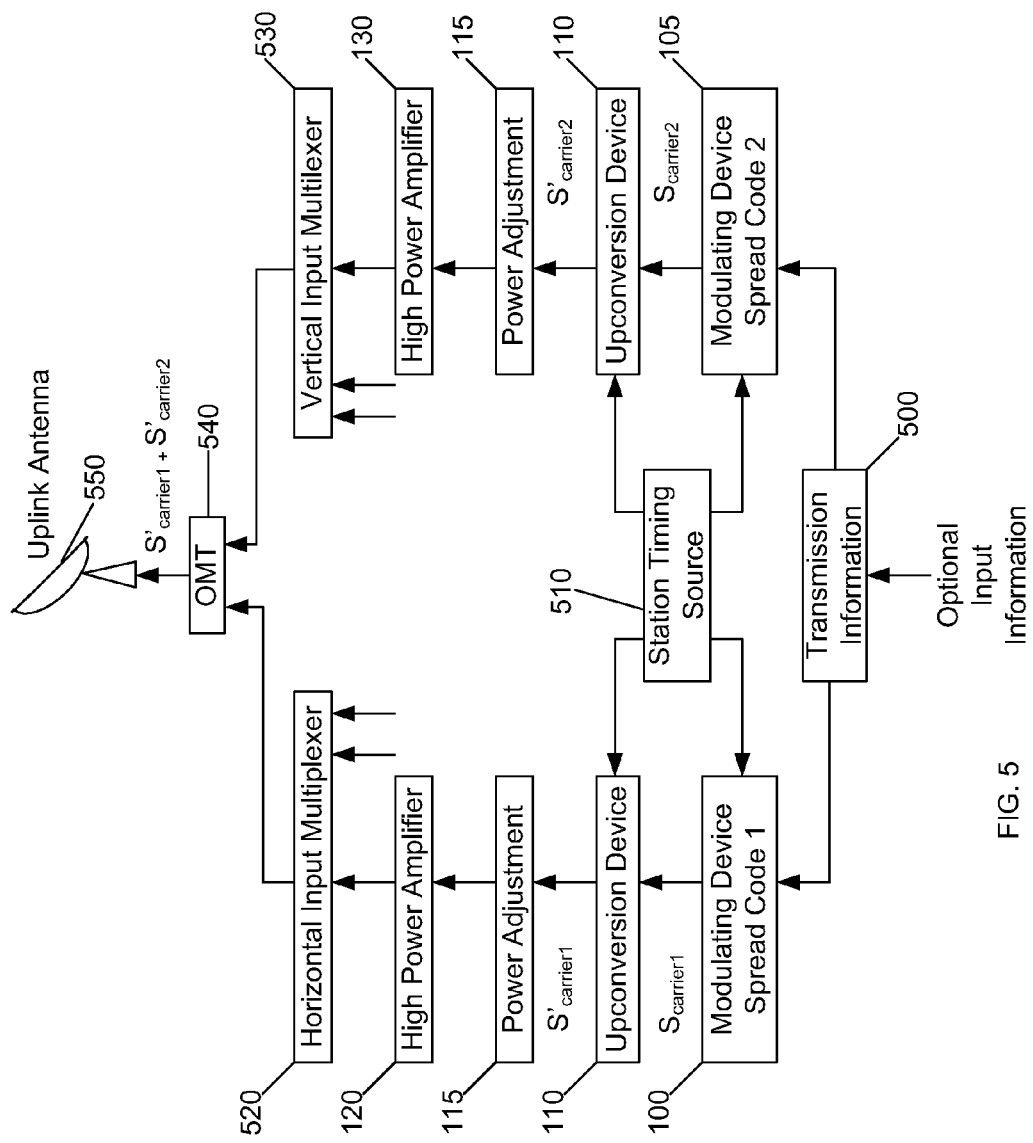
FIG. 5 is a block diagram of an implementation of a transmission system.

One implementation of a method for transmitting an electromagnetically orthogonal carrier utilizing spread spectrum code orthogonal carriers is shown in FIG. 5. The embodiment utilizes a transmission device that optimally accepts real-time or near real-time information 500, which may include timing, identity, location, or other relevant information, or allows the storage of information about the transmission or relay source for later transmission. One of ordinary skill in the art would recognize that the information may be common or unique to each modulation chain. This information is then utilized by the modulating devices 100, 105 which modulate the carriers, $S_{carrier1}$ and $S_{carrier2}$. Each modulating device 100, 105 utilizes a unique spread spectrum PRN code and is used to uniquely identify the carriers. $S_{carrier1}$ utilizes spread spectrum PRN code 1 for chipping the carrier to be utilized on the horizontal polarization, and $S_{carrier2}$ utilizes PRN code 2 for chipping the carrier to be utilized on the vertical polarization.

The modulating devices 100, 105 may utilize the same station timing source to ensure chip-level-timing is maintained, but this is not a requirement of the described method. The station timing may be provided from a common source 510 or from multiple sources and provided to the modulating 100, 105 and upconverting devices 110. The information on each EM polarization's carrier may be the same or independently different for each EM polarization's feed. The modulating device 100, 105 may accept input data from the transmission device or act alone, transmitting a self modulated carrier that may or may not include information about the transmission carrier such as site, location, timing information or service being transmitted. The modulating devices 100, 105 may be configured with same center frequency, modulation format, symbol rate, and FEC or these characteristics may be different for each modulating device 100, 105.

One of the unique aspects of the method disclosed herein is the spread spectrum spreading PRN code that enables the common elements to be brought to bear to allow the carriers to be uniquely identified. Each path is then upconverted 110, power adjusted 115, power amplified 120, 130, and multiplexed 520, 530 with other carriers that are operating on the same EM polarization, and then joined in an orthogonal mode transducer (OMT) 540 for output to the antenna 550. The output may be sent directly to the receive site or transmitted to a relay station for redirection to another location.

In some implementations, the modulation of the carrier uses binary phase shift keying (BPSK) and some level of FEC is added, however, one of ordinary skill in the art would recognize that any appropriate modulation format may be used. The output of the modulating devices is a spread-spectrum carrier signal that contains modulated symbols that have been chipped by a pre-set PRN sequence, and output at an intermediate frequency (IF) and shown as $S_{carrier1}$ and $S_{carrier2}$.

The IF output of the modulating devices is then input to an upconversion device 110 that translates the incoming IF carriers, $S_{carrier1}$ and $S_{carrier2}$, and performs and upconversion in frequency to a radio frequency (RF). The up converted carriers are designated as $S'_{carrier1}$ and $S'_{carrier2}$. The upconversion devices 110 may utilize the same station timing source to ensure chip-level-timing is maintained, but this is not a requirement of the described methods.

The RF output of the upconversion devices 110 is then input to power adjustment 115 and high-power amplification devices 120,130 to ensure the proper power is established before combining the carriers in a multiplexer 520, 530. Multiplexers 520, 530 combine carriers on common EM polarizations within an earth station. The output of the multiplexed carriers are then sent to an OMT 540, where they are combined in a manner to ensure the EM E-fields are separated by 90° and set to the proper angles for delivery to the antenna for transmission to the destination or relay station.

Figure 6:
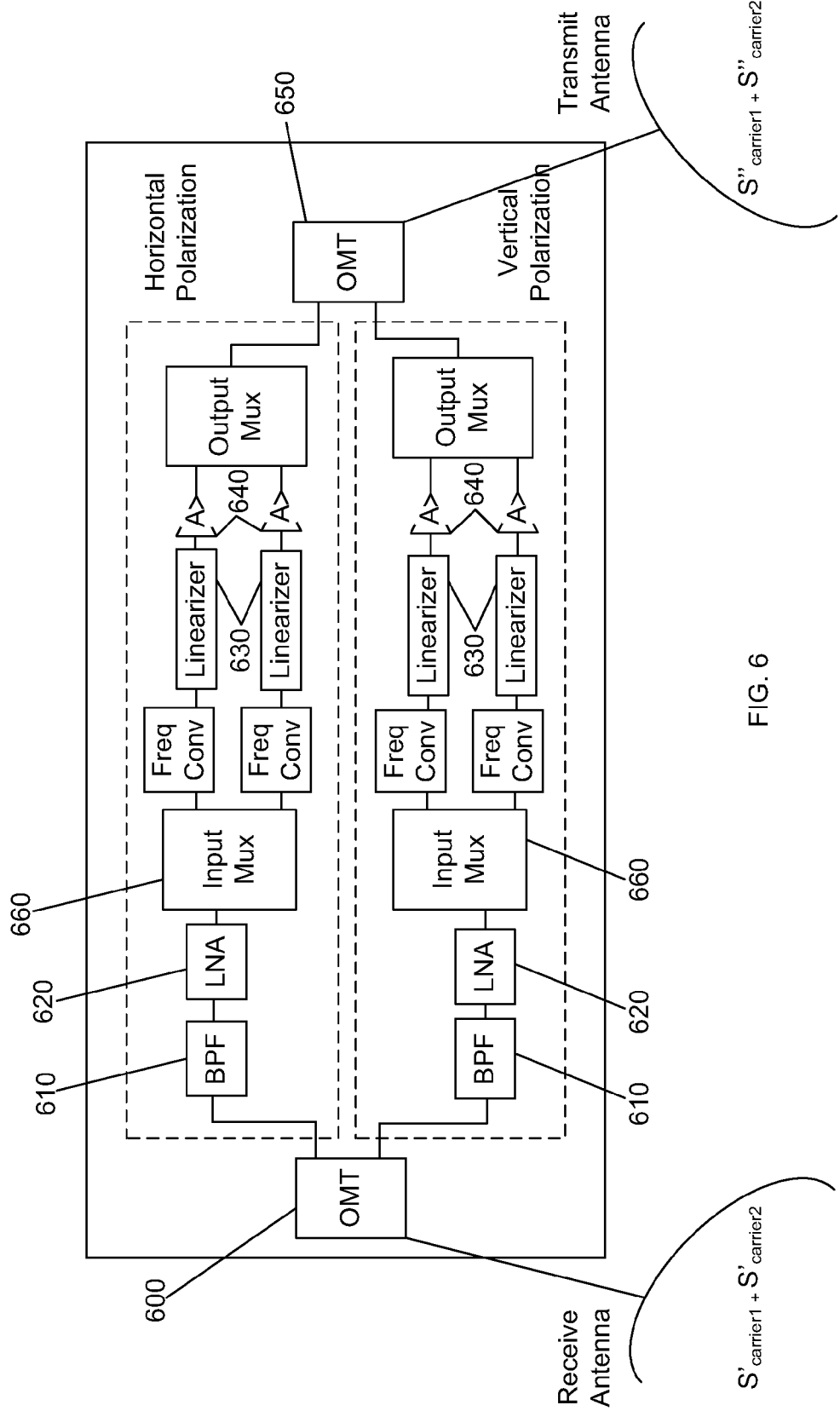
FIG. 6 is a block diagram of an implementation of an airborne or space-based relay device.

In one implementation, the radiating antenna may be directed to an airborne or space-based relay before being received at the desired reception location. As shown in FIG. 6, the relay station receives the EM orthogonal transmission and relays the polarized transmission to the destination. The upconverted carriers, $S'_{carrier1}$ and $S'_{carrier2}$, are received on respective polarizations and separated by an ingress OMT 600 that separates the common input from the antenna and directs the output to separate chains in the relay where the carrier signals are then band-pass filtered 610, amplified 620, and separated in frequency by an input multiplexer 660. The signal may be linearized 630, amplified 640 and up- or down-converted before being joined in an egress OMT 650 and sent to the transmit antenna for relay.

Figure 7:
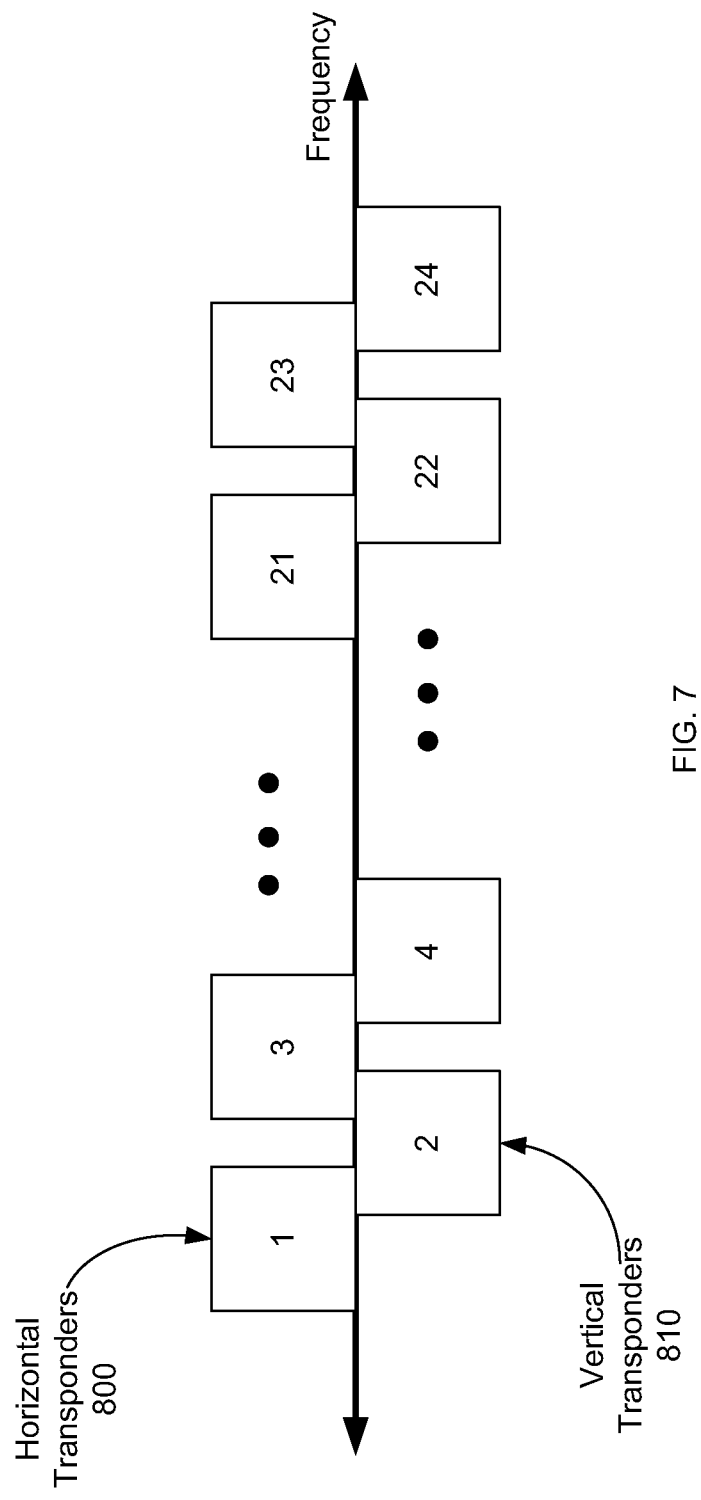
FIG. 7 is a representation of transponders for an EM transmission system using common frequency with electromagnetically orthogonal polarizations.

The relay's channelized transponders 800, 810, which support a multitude of overlapping frequencies over two EM polarizations, are shown in FIG. 7 separated by frequency and polarization.

Figure 8:
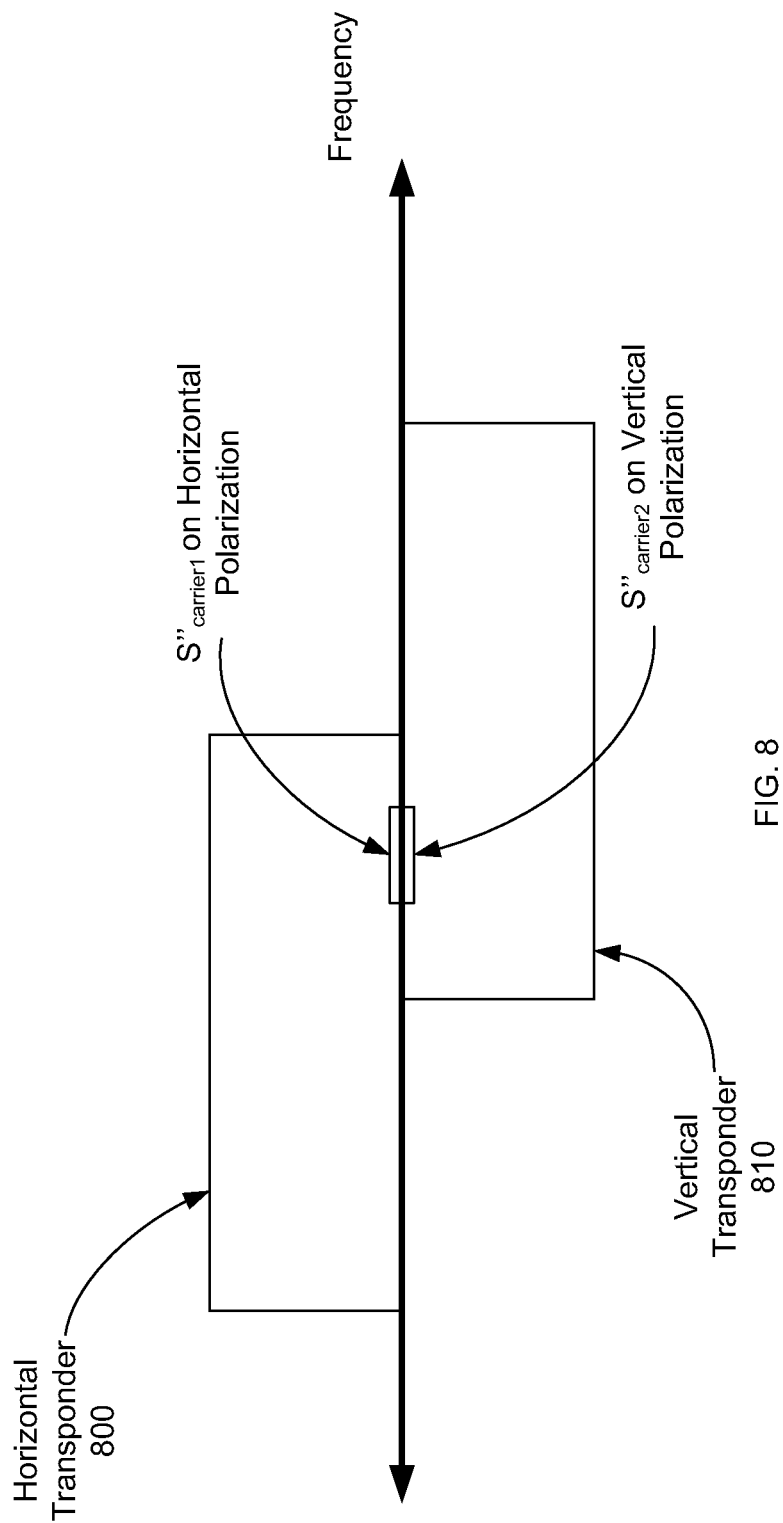
FIG. 8 is a representation of transponders for an EM transmission system using common frequency with electromagnetically orthogonal polarizations containing transmission carriers.

FIG. 8 demonstrates an expanded view of the two overlapping EM polarized transponders 800, 810 that contain the EM polarized carriers transmitted from the method shown in FIG. 1. More specifically, carriers $S'_{carrier1}$ and $S'_{carrier2}$ pass through the orthogonal transponders 800, 810 of the relay at the same frequency and occupying the same bandwidth on orthogonal transponders of the relay. Once separated into their EM orthogonal components, the respective carriers are up or down converted in frequency, linearized, amplified or padded and combined in an output multiplexer. Internal to the relay, as the carrier signals are up or down converted, the center frequencies may be modified, so the carrier signals are shifted in frequency to become $S''_{carrier1}$ and $S''_{carrier2}$. The output multiplexer contains the respective polarization, and the carrier signals are joined at the OMT and fed to the relay's transmission antenna.

In some implementations, the spectrum could be reused where the carriers $S_{carrier1}$ and $S_{carrier2}$ are situated such that the overlapping bandwidth among the carriers can be completely utilized in the event the spectrum is utilized for operation. As shown in FIG. 8, the overlapping bandwidth of transponder 1 (horizontal) 800 and transponder 2 (vertical) 810 could be implemented such that the passband of carrier $S_{carrier1}$ completely overlaps the passband of carrier $S_{carrier2}$ on the vertical polarization. As an example, if the transponders are 36 MHz wide, and the guard band between the transponders is 4 MHz, this would provide an overlap of horizontal to vertical overlap of 16 MHz.

Figure 9:
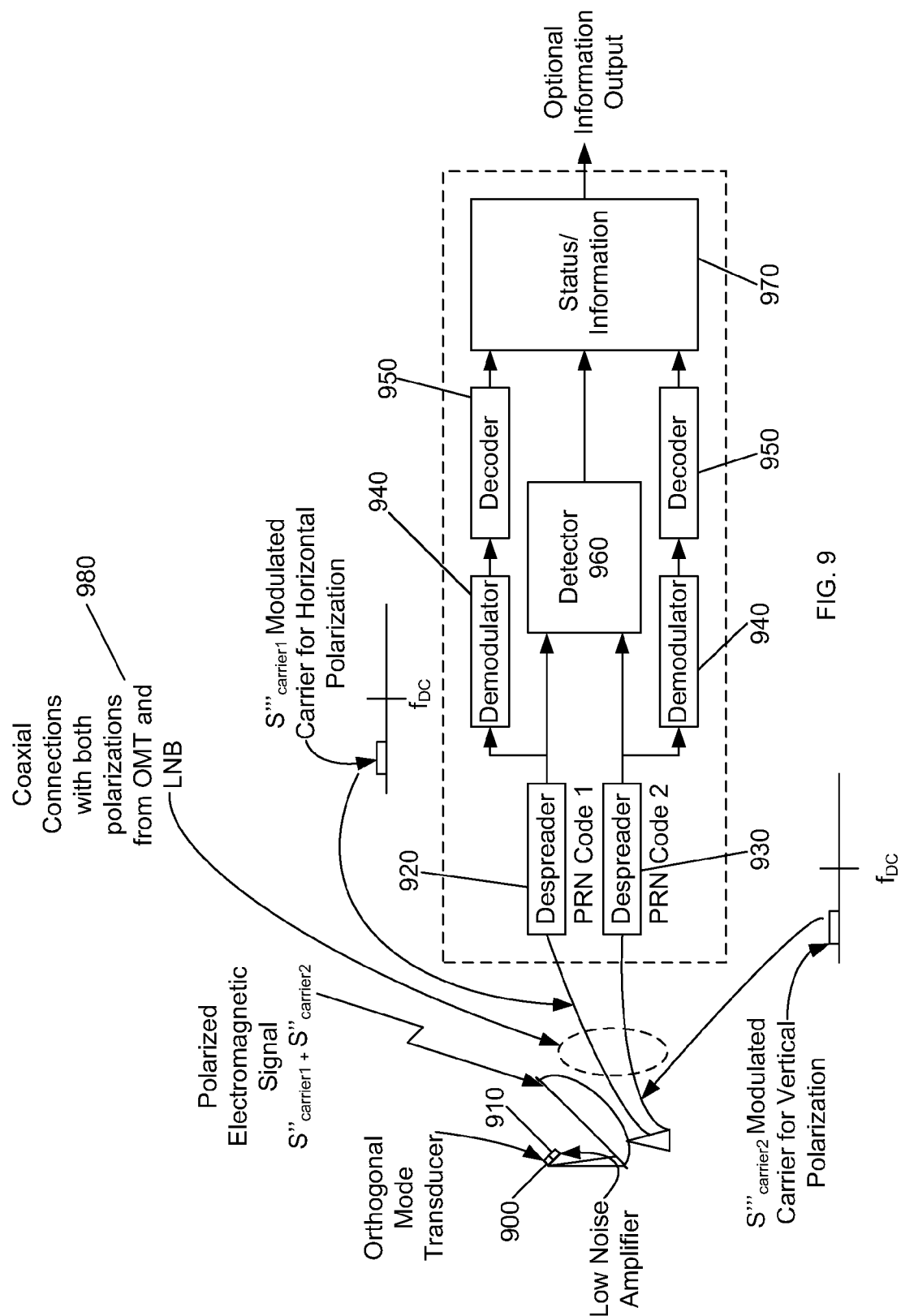
FIG. 9 is a block diagram of an implementation of a receiving station.

FIG. 9 shows an embodiment of a receiving station and device for identifying a transmission source, optimizing the pointing and adjusting the polarization of the terminal. However, one or ordinary skill in the art would recognize that this disclosure is not limited to a single device performing the described method. The input to the receiving station provides support for reception of both EM polarizations to the receiving device. At the receiving antenna, the OMT 900 separates the polarized EM signal into the respective polarizations. An LNA 910 amplifies and may down convert the EM signal to a new downlink or intermediate frequency (IF). One output of the OMT, containing the horizontal polarization, is connected to a coaxial connection 980 and contains $S'''_{carrier1}$, and a second output of the OMT, containing the vertical polarization, is connected to a second coaxial connection 980 and contains $S'''_{carrier2}$. Each carrier is separately fed to a despreader 920, 930 that utilizes an a priori PRN code for the horizontal carrier $S_{carrier1}$ (PRN Code 1) and vertical carrier $S_{carrier2}$ (PRN Code 2). The carriers may then be demodulated 940 and decoded 950. Each EM polarization utilizes an a priori center frequency, symbol rate, modulation type, FEC, and unique spread spectrum PRN code that is utilized to despread the respective carrier. A detector 960 is utilized to measure the output energy of the despread carrier. If the carrier contains modulated information about the transmission source, the modulated carrier may be demodulated 940 and decoded 950 and the information may be utilized for identification purposes about the transmission source.

As the antenna becomes more accurately pointed (azimuth, elevation and polarization) to the source and the despreader 920, 930 beings to achieve correlation, the detector 960 will begin to receive energy. As the antenna becomes more accurately pointed, the detector 960 will report increased energy, and conversely as the antenna is less accurately pointed, the detector 960 will report decreased energy thereby allowing for updated status information 970 as to the accuracy of the antenna's positioning.

In other implementations, the output of the despreaders may be input to a demodulator and decoder for extraction of modulated data that may contain information about the transmission source to include such as, for example, timing, identity, location (geographic or orbital), or any other relevant information regarding the source or target destination to where the antenna should be pointed and this information may be utilized to confirm the identity of the transmission source. As a preferred embodiment the binary phase shift keying (BPSK) carrier is demodulated to baseband. The baseband carrier is then passed to a decoder where FEC is extracted.

FIGS. 10A-D provide various configuration scenarios demonstrating how implementations of the methods disclosed herein may be used to optimize a pointing and cross polarization configuration. The electromagnetically orthogonal nature of the transmission source may be peaked or nulled by monitoring the respective carriers operating on the respective polarizations.

As discussed above, a detector is utilized to measure the output energy from the despread waveform from each despreader. Depending on the alignment of the antenna and polarization, the output energy from the detector may be observed as shown in FIGS. 10A-D. FIG. 10A shows no output from the detector being present due to an antenna that is improperly pointed to the source in either azimuth and/or elevation. FIG. 10B shows an antenna that is partially pointed to a source having improper polarization. More specifically, there is cross polarization resulting from energy from both polarizations being present. FIG. 10C shows a properly pointed antenna with the polarization set optimally to a vertical polarization. The vertical polarization is maximized where carrier $S'''_{carrier2}$ is "peaked" and carrier $S'''_{carrier1}$ is "nulled." FIG. 10D shows a properly pointed antenna with the polarization set optimally to a horizontal polarization. The horizontal polarization is maximized where carrier $S'''_{carrier1}$ is "peaked" and carrier $S'''_{carrier2}$ is "nulled." The known operational scenarios are shown in FIGS. 10A-D, but this is not intended to be an exhaustive number of scenarios.

The following are particular implementations of identification, alignment and polarization optimization techniques provided as non-limiting examples:

EXAMPLE 1

A satellite earth station is configured to operate at an assigned center frequency, symbol rate and polarization for communication with a satellite at a geo-equatorial location, polarization and frequency. For this example, the earth station is not pointed to the proper satellite and begins transmission. This results in the wrong satellite being illuminated. In the event that the improperly radiated satellite has the appropriate frequency assigned for use which is not for this carrier, the result is an outage due to energy being injected into the satellite's transponder that is then re-transmitted along with the proper carrier to receiving devices. The methods disclosed herein allow one to identify and optimize the alignment and polarization, thus providing non-interference and optimal operation.

EXAMPLE 2

A nomadic earth station as described in Example 1, is attempting to provide an ad hoc transmission. The methods disclosed herein may be used to identify the satellite, optimize the azimuth and elevation angles, and set the cross polarization before transmission commences.

EXAMPLE 3

A vehicle mounted Communications on the Move (ship, vehicle or aircraft) terminal is operating and the satellite cannot be properly located using GPS and inertial techniques. As an alternative way to identify the desired satellite, the methods disclosed herein may be utilized to identify the satellite and optimize the azimuth and elevation angles and cross polarization.

EXAMPLE 4

A vehicle mounted Communications on the Move (ship, vehicle or aircraft) terminal is operating in motion. As the vehicle moves larger distances, the tracking system will ensure the azimuth and elevation angles are maintained. However, polarization angles can become skewed to the point where the terminal begins to transmit on the orthogonal polarization. The methods disclosed herein may be utilized to constantly monitor the cross polarization in a fashion that allows the carriers to be optimized, either "peaked" for the desired polarization or "nulled" for the undesired polarization. This information may then be utilized to feed a dynamic closed loop control system to automatically adjust the proper polarization angle for optimal performance.

EXAMPLE 5

A vehicle mounted Communications on the Move (ship, vehicle or aircraft) terminal is operating in motion. As the vehicle moves larger distances, the antenna may be required to switch to another spacecraft that is in a more optimal orbital location. Using the methods disclosed herein, a multitude of satellites may be identified and an estimate may be performed of the performance of the spacecraft before a decision is made to transition to a new spacecraft for more optimal performance.

EXAMPLE 6

A terminal using the methods disclosed herein may identify all decodable transmission sources using a library of known (or manually programmed) carrier identification PRN codes and frequencies to identify all observable transmission sources, or relay, that are in view of the terminal. Once all sources are identified, alignment and polarization may be optimized to the desired transmission source.

EXAMPLE 7

A terminal using the methods disclosed herein may be configured to be disallowed to transmit until confirmation that the proper destination has been identified and an optimization method has been carried out using the methods disclosed herein is received.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of distinguishing polarizations and information about the carrier signals transmitted from a repeating relay, the method comprising:
   encoding, using an encoder, a first data stream and a second data stream at a repeating relay;
   modulating, using a modulator, the first and second encoded data streams at the repeating relay;
   spreading, using a spreader, the first modulated data stream such that a first spread waveform results having first spreading characteristics and the second modulated data stream such that a second spread waveform results having second spreading characteristics, wherein the first spreading characteristics and the second spreading characteristics are different and differentiate the first spread waveform from the second spread waveform; and
   transmitting from the repeating relay, the first spread waveform as a first spread spectrum carrier signal on a first electromagnetic (EM) polarization and the second spread waveform as a second spread spectrum carrier signal on a second EM polarization different from the first EM polarization, wherein at least one of the first and second spread spectrum carrier signals comprises data containing information about the repeating relay.

2. The method of claim 1, wherein the first and second carrier signals exhibit similar encoding and modulation characteristics.

3. The method of claim 2, wherein the data stream contains information about at least one of an owner, a location, a power, a frequency capability, and an adjacent repeater of the repeating relay.

4. The method of claim 1, wherein modulation format, Forward Error Coding (FEC) rate, center frequency, and symbol rate is the same for the first and second carrier signals.

5. The method of claim 1, further comprising:
   receiving, at a receiver, the first spread spectrum carrier signal and the second spread spectrum carrier signal; and
   distinguishing between the first EM polarization and the second EM polarization based on different spreading characteristics exhibited on the respective first and second spread spectrum carrier signals.

6. The method of claim 5, further comprising identifying a spread spectrum sequence for the first and second carrier signals based on a unique spread sequence that is applied to each carrier signal.

7. The method of claim 1, wherein spreading the first and second modulated data streams further comprises applying the same spread sequence to each of the first and second modulated data streams and further phase advancing the first spread waveform from the second spread waveform on an orthogonal polarization.

8. The method of claim 1, wherein spreading the first and second modulated data streams further comprises applying the same spread sequence to each of the first and second modulated data streams and further phase retarding the first spread waveform from the second spread waveform on an orthogonal polarization.

9. The method of claim 1, wherein the first and second carrier signals have different center frequencies.

10. The method of claim 1, wherein the first and second carrier signals have different symbol rates.

11. The method of claim 1, wherein the first and second encoded data streams are modulated using different modulation formats.

12. The method of claim 1, wherein the first and second carrier signals have different FEC types.

13. The method of claim 1, wherein the first and second carrier signals have different FEC rates.

14. The method of claim 1, wherein at least one of the first and second carrier signals is allocated a spectrum having no other carrier present within the spectrum.

15. The method of claim 1, wherein at least one of the first and second carrier signals exists with an additional carrier present within at least a portion of a bandwidth to which the at least one of the first and second carrier signals is allocated.

16. The method of claim 15, wherein the additional carrier is present within the entire bandwidth to which at least one of the first and second carrier signals is allocated.

17. The method of claim 1, wherein the transmitting further comprises transmitting the first and second carrier signals to the repeating relay.

18. The method of claim 1, further comprising transmitting from the repeating relay within at least one of the first carrier signal and the second carrier signal, information from a remote transmission device.

19. The method of claim 18, further comprising, storing using a storing device, information about the repeating relay received from the repeating relay.

20. A method of distinguishing polarizations of carrier signals transmitted from a repeating relay, the method comprising:
   receiving, at a receiver, a first spread spectrum carrier signal transmitted from a repeating relay on a first electromagnetic (EM) polarization and a second spread spectrum carrier signal transmitted from the repeating relay on a second EM polarization, different from the first EM polarization, wherein at least one of the first and second spread spectrum carrier signals comprises data containing information about the repeating relay; and
   distinguishing between the first EM polarization and the second EM polarization based on different spreading characteristics exhibited on the respective first and second spread spectrum carrier signals.

21. The method of claim 20, wherein the first and second carrier signals exhibit similar encoding and modulation characteristics.

22. The method of claim 21, wherein the data stream contains information about at least one of an owner, a location, a power, a frequency capability, and an adjacent repeater of the repeating relay.

23. The method of claim 20, further comprising:
   despreading, using a despreader, a spread waveform;
   demodulating, using a demodulator, the despread waveform; and
   decoding, using a decoder, the demodulated waveform such that a data stream results.

24. The method of claim 20, wherein the modulation format, Forward Error Coding (FEC) rate, center frequency, and symbol rate is the same for each of the first and second carrier signals.

25. The method of claim 24 wherein the unique spread sequences are a piori and are pre-programmed into a detection device for providing detection status of a detected signal.

26. The method of claim 24, wherein the unique spread sequences are loaded into a detection device on demand.

27. The method of claim 20, further comprising identifying a spread spectrum sequence for the first and second carrier signals corresponding to a unique spread sequence that is applied to each carrier signal.

28. The method of claim 20, further comprising identifying a spread spectrum sequence for the first and second carrier signals wherein the spread spectrum sequence is the same and the first spread waveform is phase advanced from the second spread waveform on an orthogonal polarization.

29. The method of claim 20, further comprising identifying a spread spectrum sequence for the first and second carrier signals wherein the spread spectrum sequence is the same and the first spread waveform is phase retarded from the second spread waveform on an orthogonal polarization.

30. The method of claim 20, wherein the first and second carrier signals have different center frequencies.

31. The method of claim 20, wherein the first and second carrier signals have different symbol rates.

32. The method of claim 20, wherein the first and second carrier signals are demodulated using different demodulation formats.

33. The method of claim 20, wherein the first and second carrier signals have different FEC types.

34. The method of claim 20, wherein the first and second carrier signals have different FEC rates.

35. The method of claim 20, wherein at least one of the first and second carrier signals is allocated a spectrum having no other carrier present within the spectrum.

36. The method of claim 20, wherein at least one of the first and second carrier signals exists with an additional carrier present within at least a portion of a bandwidth to which the at least one of the first and second carrier signals is allocated.

37. The method of claim 36, wherein the additional carrier is present within the entire bandwidth to which the at least one of the first and second carrier signals is allocated.

38. The method of claim 20, further comprising indicating, by the receiver, identification of a desired repeating relay.

39. The method of claim 20, further comprising indicating, by the receiver, identification of an undesired repeating relay.

40. A system for distinguishing polarizations and information about the carrier signals transmitted from a repeating relay, the system comprising:
an encoder that encodes a first data stream and a second data stream at a repeating relay;
a modulator that modulates the first and second encoded data streams at the repeating relay;
a spreader that spreads the first modulated data stream such that a first spread waveform results having first spreading characteristics and the second modulated data stream such that a second spread waveform results having second spreading characteristics, wherein the first spreading characteristics and the second spreading characteristics are different and differentiate the first spread waveform from the second spread waveform; and
a transmitting device that transmits from the repeating relay, the first spread waveform as a first spread spectrum carrier signal on a first electromagnetic (EM) polarization and the second spread waveform as a second spread spectrum carrier signal on a second EM polarization different from the first EM polarization, wherein at least one of the first and second spread spectrum carrier signals comprises data containing information about the repeating relay.

41. The system of claim 40, wherein the first and second carrier signals exhibit similar encoding and modulation characteristics.

42. The system of claim 41, wherein the data stream contains information about at least one of an owner, a location, a power, a frequency capability, and an adjacent repeater of the repeating relay.

43. The system of claim 40, wherein modulation format, Forward Error Coding (FEC) rate, center frequency, and symbol rate is the same for the first and second carrier signals.

44. The system of claim 40, further comprising:
a receiver that receives, the first spread spectrum carrier signal and the second spread spectrum carrier signal and distinguishes between the first EM polarization and the second EM polarization based on different spreading characteristics exhibited on the respective first and second spread spectrum carrier signals.

45. The system of claim 44, wherein the receiver identifies a spread spectrum sequence for the first and second carrier signals based on a unique spread sequence that is applied to each carrier signal.

46. The system of claim 40, wherein the spreader applies the same spread sequence to each of the first and second modulated data streams and phase advances the first spread waveform from the second spread waveform on an orthogonal polarization.

47. The system of claim 40, wherein the spreader applies the same spread sequence to each of the first and second modulated data streams and phase retards the first spread waveform from the second spread waveform on an orthogonal polarization.

48. The system of claim 40, wherein the first and second carrier signals have different center frequencies.

49. The system of claim 40, wherein the first and second carrier signals have different symbol rates.

50. The system of claim 40, wherein modulator modulates the first and second encoded data streams using different modulation formats.

51. The system of claim 40, wherein the first and second carrier signals have different FEC types.

52. The system of claim 40, wherein the first and second carrier signals have different FEC rates.

53. The system of claim 40, wherein at least one of the first and second carrier signals is allocated a spectrum having no other carrier present within the spectrum.

54. The system of claim 40, wherein at least one of the first and second carrier signals exists with an additional carrier present within at least a portion of a bandwidth to which the at least one of the first and second carrier signals is allocated.

55. The system of claim 54, wherein the additional carrier is present within the entire bandwidth to which at least one of the first and second carrier signals is allocated.

56. The system of claim 40, wherein the transmitting device further transmits the first and second carrier signals to the repeating relay.

57. The system of claim 40, wherein the transmitting device further transmits from the repeating relay within at least one of the first carrier signal and the second carrier signal, information from a remote transmission device.

58. The system of claim 57, further comprising, a storing device that stores information about the repeating relay received from the repeating relay.

59. A system for distinguishing polarizations of carrier signals transmitted from a repeating relay, the system comprising:
a receiver that receives a first spread spectrum carrier signal transmitted from a repeating relay on a first electromagnetic (EM) polarization and a second spread spectrum carrier signal transmitted from the repeating relay on a second EM polarization, different from the first EM polarization, at least one of the first and second spread spectrum carrier signals comprising data containing information about the repeating relay; wherein the receiver distinguishes between the first EM polarization and the second EM polarization based on different spreading characteristics exhibited on the respective first and second spread spectrum carrier signals a despreader that dispreads a spread waveform;

a demodulator that demodulates the despread waveform; and a decoder that decodes the demodulated waveform such that a data stream results.

60. The system of claim 59, wherein the first and second carrier signals exhibit similar encoding and modulation characteristics.

61. The system of claim 60, wherein the data stream contains information about at least one of an owner, a location, a power, a frequency capability, and an adjacent repeater of the repeating relay.

62. The system of claim 59, wherein the modulation format, Forward Error Coding (FEC) rate, center frequency, and symbol rate is the same for each of the first and second carrier signals.

63. The system of claim 62 further comprising a detection device configured to provide detection status of a detected signal wherein the unique spread sequences are a piori and are pre-programmed into the detection device.

64. The system of claim 62, further comprising a detection device configured to receive the unique spread sequences on demand.

65. The system of claim 59, wherein the receiver further identifies a spread spectrum sequence for the first and second carrier signals corresponding to a unique spread sequence that is applied to each carrier signal.

66. The system of claim 59, wherein the receiver further identifies a spread spectrum sequence for the first and second carrier signals wherein the spread spectrum sequence is the same and the first spread waveform is phase advanced from the second spread waveform on an orthogonal polarization.

67. The system of claim 59, wherein the receiver further identifies a spread spectrum sequence for the first and second carrier signals wherein the spread spectrum sequence is the same and the first spread waveform is phase retarded from the second spread waveform on an orthogonal polarization.

68. The system of claim 59, wherein the first and second carrier signals have different center frequencies.

69. The system of claim 59, wherein the first and second carrier signals have different symbol rates.

70. The system of claim 59, wherein the first and second carrier signals are demodulated using different demodulation formats.

71. The system of claim 59, wherein the first and second carrier signals have different FEC types.

72. The system of claim 59, wherein the first and second carrier signals have different FEC rates.

73. The system of claim 59, wherein at least one of the first and second carrier signals is allocated a spectrum having no other carrier present within the spectrum.

74. The system of claim 59, wherein at least one of the first and second carrier signals exists with an additional carrier present within at least a portion of a bandwidth to which the at least one of the first and second carrier signals is allocated.

75. The system of claim 74, wherein the additional carrier is present within the entire bandwidth to which the at least one of the first and second carrier signals is allocated.

76. The system of claim 59, wherein the receiver indicates identification of a desired repeating relay.

77. The system of claim 59, wherein the receiver indicates identification of an undesired repeating relay.

* * * * *